(12) United States Patent
Harrison et al.

(10) Patent No.: US 9,587,421 B1
(45) Date of Patent: Mar. 7, 2017

(54) DUAL CLUTCH CABLE CONTROL SYSTEM

(71) Applicant: Dura Operating, LLC, Auburn Hills, MI (US)

(72) Inventors: John W. Harrison, Goodrich, MI (US); Aubrey J. Nofzinger, Rochester Hills, MI (US)

(73) Assignee: DURA OPERATING, LLC, Auburn Hills, MI (US)

(*) Notice: Subject to any disclaimer, the term of this patent is extended or adjusted under 35 U.S.C. 154(b) by 8 days.

(21) Appl. No.: 14/924,794

(22) Filed: Oct. 28, 2015

(51) Int. Cl.
*B60P 1/267* (2006.01)
*E05F 15/627* (2015.01)
*B60J 5/10* (2006.01)
*E05F 15/70* (2015.01)

(52) U.S. Cl.
CPC .............. *E05F 15/627* (2015.01); *B60J 5/10* (2013.01); *E05F 15/70* (2015.01); *E05Y 2201/404* (2013.01); *E05Y 2201/434* (2013.01); *E05Y 2400/44* (2013.01); *E05Y 2400/45* (2013.01); *E05Y 2900/546* (2013.01)

(58) Field of Classification Search
CPC . E05F 15/627; E05F 15/70; B60J 5/10; E05Y 2201/404; E05Y 2201/434; E05Y 2400/44; E05Y 2500/45; E05Y 2900/546
See application file for complete search history.

(56) References Cited

U.S. PATENT DOCUMENTS

| | | | |
|---|---|---|---|
| 5,722,612 A | 3/1998 | Feathers | |
| 7,281,748 B2 | 10/2007 | Ruhlander et al. | |
| 7,404,544 B2 | 7/2008 | McDonald et al. | |
| 7,677,628 B2 | 3/2010 | Lowentat et al. | |
| 8,109,553 B2 | 2/2012 | Zielinsky | |
| 2009/0178887 A1 | 7/2009 | Reeves et al. | |

*Primary Examiner* — Lori L Lyjak
(74) *Attorney, Agent, or Firm* — Reising Ethington P.C.; Matthew J. Schmidt; Robert E. Ford (57) ABSTRACT

In at least some implementations, a cable control system includes a spool on which a portion of a cable may be taken up and released, an input shaft coupled to the spool, and a motor coupled to the input shaft to drive the input shaft and spool in a first direction to take up cable on the spool and in a second direction to release cable from the spool. The control system also has two clutches that allow rotation of the spool without corresponding rotation of the motor. Each clutch may have a first member coupled to the input shaft and a second member coupled to the spool and relative rotation between the first and second members of the clutch allows rotation of the spool relative to the motor or input shaft.

22 Claims, 8 Drawing Sheets

DUAL CLUTCH CABLE CONTROL SYSTEM

TECHNICAL FIELD

The present disclosure relates to a control system for winding and unwinding cable, such as may be used to open and close a vehicle tailgate or the like.

BACKGROUND

Some motor vehicles include a rear access panel, such as a tailgate or liftgate, that is mounted at its bottom on a pivot so that the access panel can be moved between a substantially vertical closed position and a generally horizontal open position. One or more wires or cables may be attached between a portion of the vehicle body and the tailgate to limit the extent to which the tailgate may be pivoted to its open position. The wires run through openings in the tailgate to a storage spool arranged in the interior of the tailgate which rotates to take up wire as the tailgate is closed and pay out wire as the tailgate is opened.

SUMMARY

In at least some implementations, a cable control system includes a spool on which a portion of a cable may be taken up and released, an input shaft coupled to the spool, and a motor coupled to the input shaft to drive the input shaft and spool in a first direction to take up cable on the spool and in a second direction to release cable from the spool. The control system also has two clutches that allow rotation of the spool without corresponding rotation of the motor. Each clutch may have a first member coupled to the input shaft and a second member coupled to the spool and relative rotation between the first and second members of the clutch allows rotation of the spool relative to the motor or input shaft.

In at least some implementations, the first clutch prevents rotation in a first direction of the first clutch second member relative to the first clutch first member and permits rotation in a second direction of the first clutch second member relative to the first clutch first member. The first clutch first member may include one or more pawls and the first clutch second member may include one or more teeth selectively engageable with a pawl, wherein the teeth and pawl have stop surfaces that engage each other during rotation in the first direction. In at least some implementations, the first clutch second member is coupled to the spool by the second clutch.

The second clutch includes a first member and a second member, and the second clutch second member may be coupled to and rotate with the spool. The second clutch may be arranged to prevent relative rotation between the second clutch first member and the second clutch second member until a threshold force differential is applied to or across the second clutch members. The second clutch first member and the second clutch second member may include retention elements that are engaged until a threshold differential force is applied to one of the second clutch first member and the second clutch second member whereupon the retention elements disengage and permit relative rotation between the second clutch first member and the second clutch second member. In at least some implementations, the second clutch first member and second clutch second member include generally flat surfaces that face each other in assembly and have nonplanar portions that define the retention members. At least one of the second clutch first member and the second clutch second member may include weakened portions to decrease the threshold differential force required to disengage the retention elements.

The system may also include a take up actuator coupled to the spool to rotate the spool relative to the input shaft in the first direction when the spool rotates relative to the input shaft. The take up actuator may be implemented as a spring that yieldably biases the spool for rotation in the first direction. And the system may also include at least one sensor and a controller communicated with the sensor, the sensor providing to the controller a signal indicative of the rotary position of the spool, and the controller being communicated with the motor and operable to enable control of the motor as a function of the sensor signal. In this way, the position of the tailgate can be known even if the tailgate is moved manually, without being driven by the motor.

In at least some implementations, a powered tailgate assembly includes at least one cable adapted to be coupled between a vehicle body and a vehicle tailgate, a spool, an electrically powered drive and two clutches. The spool is operably associated with the cable to take up cable as the tailgate is retracted and to release cable when the tailgate is lowered. The electrically powered drive is releasably coupled to the spool to rotate the spool in a first direction to cause the tailgate to move toward a closed position and a second direction to move the tailgate or allow an external load (e.g. gravity and/or a spring) to move the tailgate toward an open position. A first clutch is coupled between the drive and the spool to permit rotation of the spool relative to drive when the tailgate is moved toward the closed position by something other than the drive. And a second clutch is coupled between the drive and the spool to permit rotation of the spool relative to the drive when a threshold force is applied to the tailgate, by something other than the drive, to move the tailgate toward the open position.

In at least some implementations, the first clutch is coupled to the drive and to the second clutch, and the second clutch is connected to the first clutch and to the spool. The second clutch may include a second clutch first member and a second clutch second member coupled to the spool and releasably coupled to the second clutch first member. The first clutch may include a first clutch first member coupled to the drive for rotation with the drive and a first clutch second member coupled to second clutch first member for rotation with the second clutch first member.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Referring in more detail to the drawings, FIGS. 1-5 illustrate a cable control system 10 that may be used with a cable 12 to control the take up and pay out of the cable. The control system 10 may include a drive 14, such as an electric motor, to provide a powered take up and/or pay out of the cable 12 and thereby drive a component coupled to the cable between first and second positions. In the implementation shown in FIG. 2, the cable control system 10 is connected to a vehicle tailgate 16, such as is commonly provided in a pick-up truck, to facilitate opening and closing the tailgate. The cable control system 10 may also be used with all or part of a liftgate commonly found on sport utility vehicles, some hatchbacks station wagons and the like, or for doors or other components associated with vehicle access openings. The remainder of this description will refer to a tailgate 16, although the control system 10 may be used in other applications.

A lower portion of the tailgate 16 may be connected to the vehicle body for pivoted motion of the tailgate relative to the remainder of the vehicle between open and closed positions. As the cable 12 is released or paid out from the control system 10, the tailgate 16 may move toward the open position and as the cable 12 is taken up by the control system 10, the tailgate 16 may move toward the closed position. The control system 10 also includes two clutches 18, 20 (FIGS. 4 and 5) that permit movement of the tailgate 16 relative to the drive 14 or when the drive is not operating. For example, the tailgate 16 may be moved between its opened and closed positions manually if the drive 14 is not operable or when manual operation is preferred.

Figure 1:
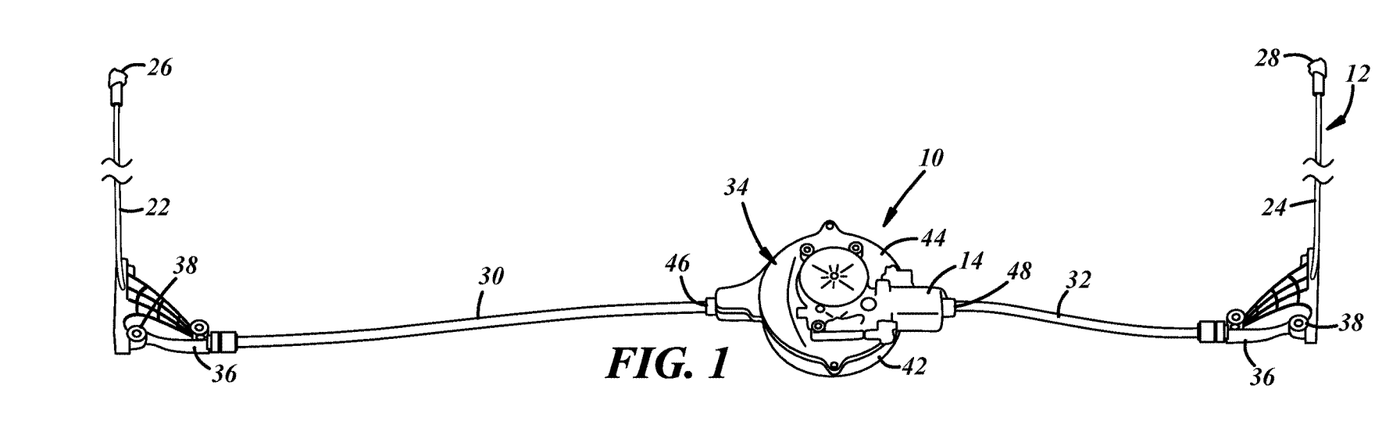
FIG. 1 is a perspective view of a cable control assembly.
Figure 2:
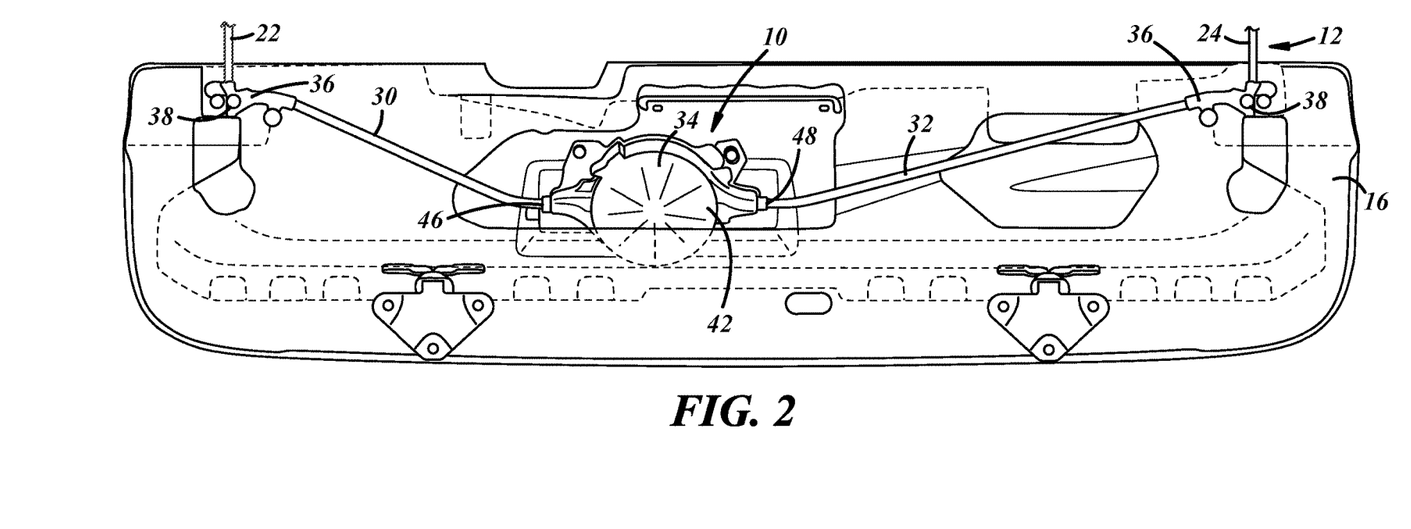
FIG. 2 is a perspective view of the cable control assembly shown installed on a vehicle tailgate.

As shown in FIGS. 1 and 2, the cable 12 may be one continuous length of cable, or two discrete lengths of cable, that is/are simultaneously taken up or paid out by the control system 10. Whether in one piece or more than one piece, the cable 12 may be considered to have two segments 22, 24 with a first segment 22 extending from the control system 10 to a free end 26 that is attached to the vehicle adjacent to one side of the tailgate 16 and the second segment 24 extending from the control system 10 to a free end 28 that is attached the vehicle adjacent to the other side of the tailgate 16. To protect and guide the cable 12 relative to the tailgate 16 and the control system 10, one or more tubular conduits may be provided with the cable slidably received within the conduits. In the example shown, two conduits are provided with the first cable segment 22 extending through a first conduit 30 and the second cable segment 24 extending through a second conduit 32. The conduits 30, 32 may each be coupled to and extend from a housing 34 of the control system 10 to brackets 36 or other connectors mounted adjacent to the upper corners of the tailgate. The bracket 36 or tailgate 16 may carry a pulley or other guide 38 around which the cable 12 is routed to route the cable through an approximately ninety degree bend as the cable extends in a lateral or cross-car direction within the tailgate 16 and from the control system 10, and is then routed from the tailgate 16 to the vehicle body in a manner that allows the pivoted motion of the tailgate between its open and closed positions. The cable 12 may be a stranded wire, flat wire, rope, solid wire or of any other suitable construction.

Figure 3:
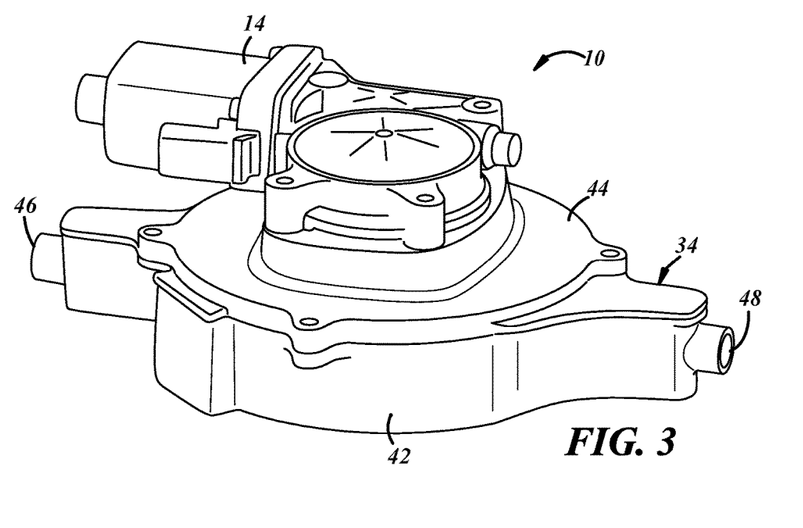
FIG. 3 is a perspective view of the cable control assembly shown without any cable.
Figure 4:
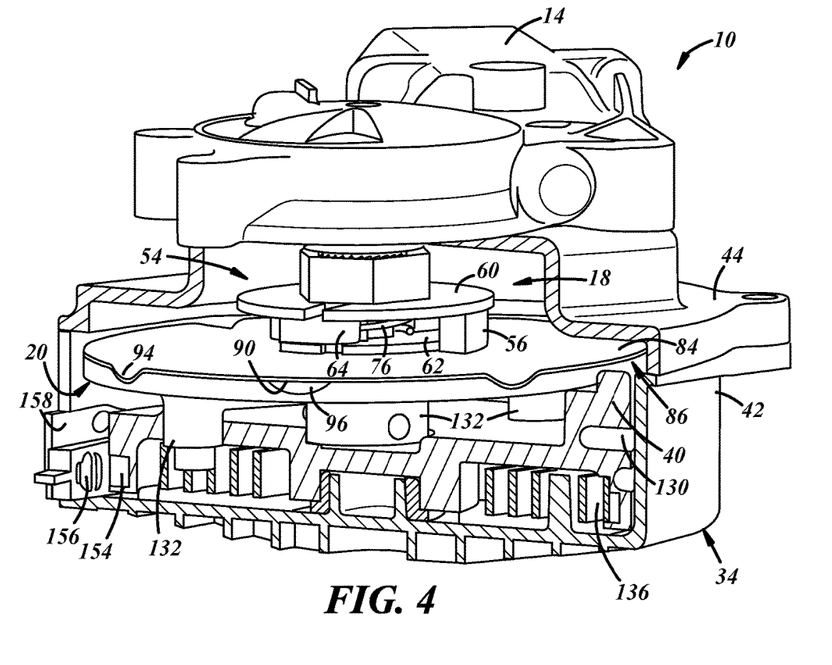
FIG. 4 is a partially sectioned perspective view of the cable control assembly without any cable.
Figure 5:
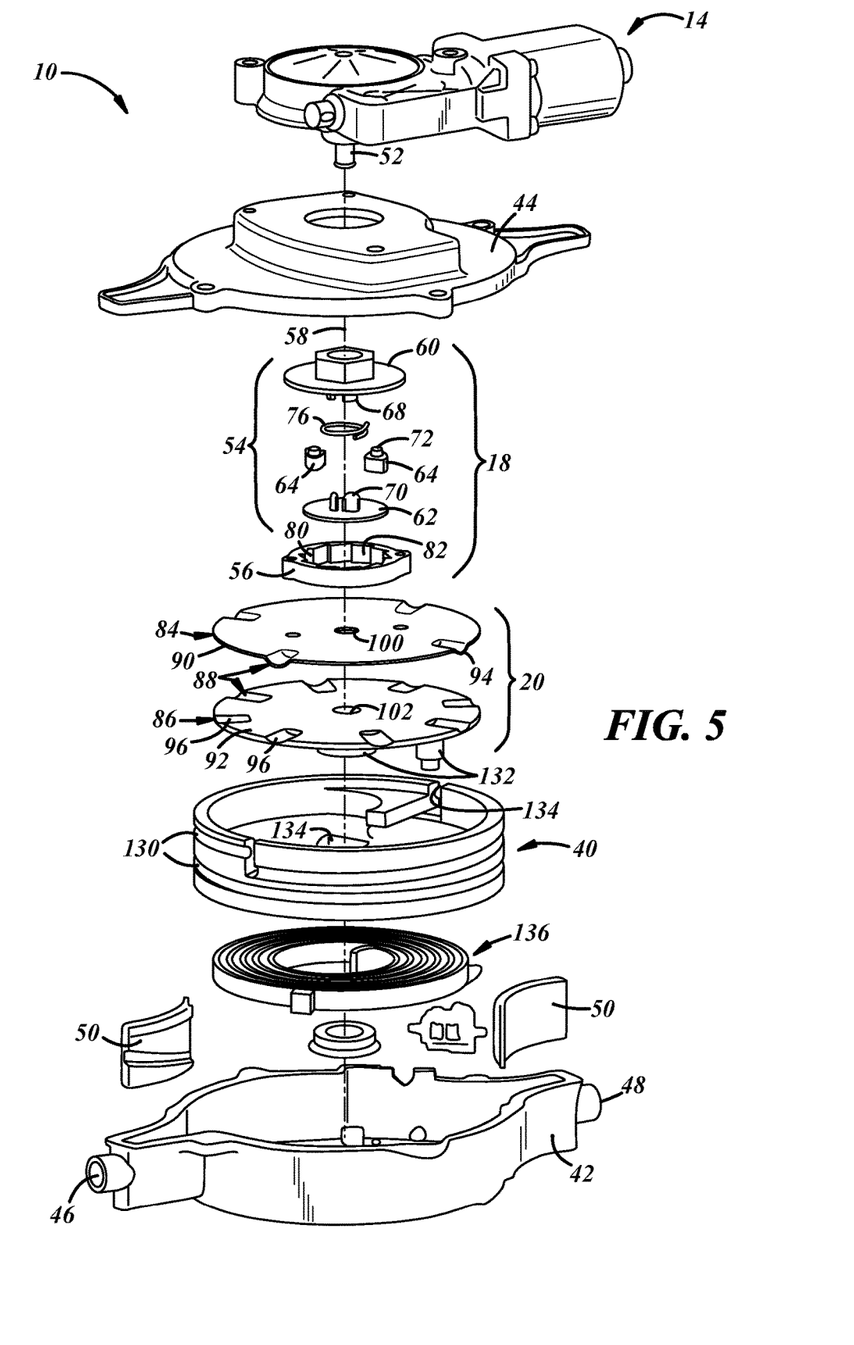
FIG. 5 is an exploded view of the cable control assembly.

As best shown in FIGS. 3-5, the control system 10 includes the housing 34, a spool 40 to take up and pay out the cable 12, the drive 14 which is coupled to the spool 40 to rotate the spool, and first and second clutches 18, 20 that are coupled between the drive 14 and spool 40. The housing 34 may include a base 42 and a cover 44 that when coupled together define an interior in which the spool 40, clutches 18, 20 and other components may be mounted. The cable 12 may extend out of the housing 34 through opposed openings 46, 48 in the housing 34, and guides 50 (FIG. 5) may be carried by the housing 34, each adapted to engage one cable segment 22, 24 between the openings 46, 48 and the spool 40, if desired. The guides 50 may reduce friction on the cable 12 and help control cable movement into and out of the housing 34. The drive 14 may include an electric motor carried by the housing 34 (e.g. the cover) to provide a self-contained unit, if desired. The drive 14 may rotate an input shaft 52 (FIG. 5) that is coupled to the spool 40 through the first and second clutches 18, 20. The input shaft 52 may be directly driven by the motor 14, or it may be driven through one or more gears driven by an output shaft of the motor.

Figure 6:
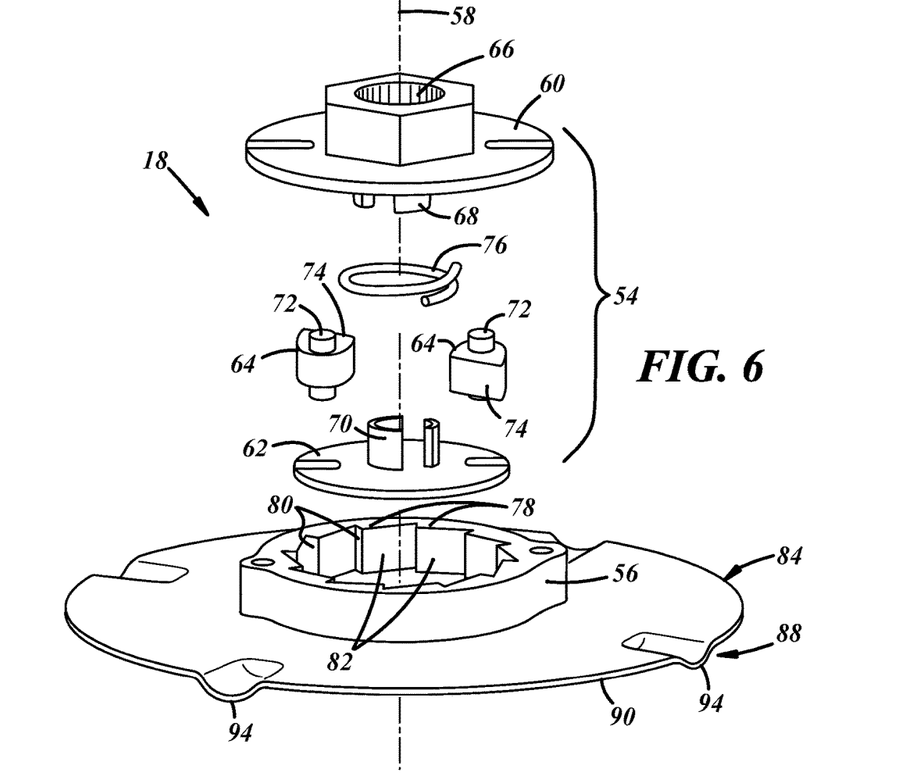
FIG. 6 is an exploded view of a first clutch of the cable control assembly.
Figure 7:
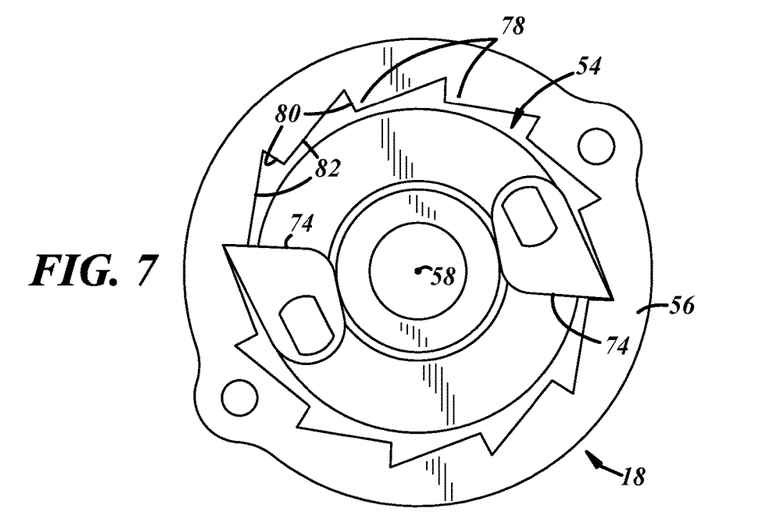
FIG. 7 is a plan view of the first clutch minus the upper plate.

As shown in FIGS. 4 and 5, the input shaft 52 is coupled to the first clutch 18. In more detail, and as also shown in FIGS. 6 and 7, the first clutch 18 includes a first member 54 and a second member 56 that is selectively rotatable relative to the first member 54. The first member 54 of the first clutch 18 is coupled to the input shaft 52 for co-rotation with the input shaft about an axis 58 of rotation. In the implementation shown, for example in FIGS. 6 and 7, the first member 54 includes an upper plate 60, a lower plate 62 fixed to the upper plate for co-rotation therewith and one or more pawls 64 received between the upper and lower plates 60, 62. To couple the first member 54 to the input shaft 52, the upper plate 60 may include a drive feature, such as inwardly extending teeth or splines 66 (FIG. 6) adapted to engage corresponding features of the input shaft 52 for rotation with the input shaft.

As shown in FIG. 6, to facilitate coupling the upper plate 60 and lower plate 62 with a gap between them sufficient to permit movement of the pawl(s) 64 relative to the plates, the upper plate 60 may include a depending boss or projection 68 that engages part of the lower plate 62 and/or the lower plate 62 may include an upstanding boss or projection 70 that engages the upper plate 60. The boss or bosses 68, 70 provide a distance between the upper plate 60 and lower plate 62 that is greater than the thickness of each pawl 64.

Each pawl 64 (two are shown) may be mounted to the upper and lower plates 60, 62 by a pin 72 (FIGS. 5 and 6) so that each pawl 64 may pivot relative to the upper and lower plates. As shown in FIGS. 6 and 7, each pawl 64 includes an outwardly oriented (relative to the axis of rotation) stop or stop surface 74 that is engageable with the second member 56 of the first clutch 18 when the input shaft 52 is rotated in one direction but not the other. In this way, the first and second members 54, 56 of the first clutch 18 rotate together in one direction but may rotate relative to each other in the other direction, as will be explained more fully below. A biasing member, shown as a torsion spring 76, may yieldably bias the pawls 64 toward the second member 56 to ensure engagement with the second member in the first direction of rotation. In the implementation shown, the second member 56 is annular, the pawls 64 are received within the interior of the second member 56, and the pawls 64 are yieldably biased radially outwardly into engagement with the second member 56.

The second member 56 of the first clutch 18 includes a plurality of inwardly extending teeth 78 which define stops or stop surfaces 80 each adapted to be selectively engaged with a stop 74 on a pawl 64, and sloped transition surfaces 82 between adjacent stop surfaces 80. The transition surfaces 82 are radially inwardly inclined at a relatively shallow angle (compared to the stop surfaces 80 which may be radially oriented or at some steeper angle than the transition surfaces). When the second member 56 is rotated in the direction wherein the stop surfaces 74, 80 are not brought into engagement, the transition surfaces 82 radially inwardly pivot the pawls 64 without significant interference between the pawls 64 and second member 56 to permit relative rotation between the first and second members 54, 56. In the example shown, the stop surfaces 74, 80 confront each other and are engaged to prevent relative rotation between the first and second members 54, 56 when the first member 54 is driven clockwise, but the second member 56 may rotate clockwise relative to the first member.

In at least some implementations, the first clutch 18 is coaxially aligned with and coupled to the second clutch 20 and the second clutch 20 is coaxially aligned with and coupled to the spool 40. In the implementation shown, the second clutch 20 includes a first member 84 connected to the second member 56 of the first clutch 18 and a second member 86 connected to the spool 40 for rotation with the spool. One or more retention elements 88 are provided in the second clutch 20 to permit relative rotation between the first and second members 84, 86 of the second clutch 20 when a threshold force differential exists across the second clutch. For example, if the first member 84 of the second clutch 20 is held against rotation and the second member 86 of the second clutch 20 is acted on by a force above a threshold value tending to rotate the second member 86, the second member 86 may rotate relative to the first member 84. If the force differential on the first member 84 and second member 86 is within the threshold, the first and second members 84, 86 rotate together.

In the implementation shown, the first and second members 84, 86 have relatively flat surfaces 90, 92 arranged adjacent to each other and coaxially aligned and the retention elements 88 include one or more nonplanar features, such as detents, including one or more projections 94 on one plate and one or more complementary recesses 96 in the other plate. When the first and second members 84, 86 are coupled for co-rotation, each projection 94 is received within a recess 96 and a certain force is required to move the projections 94 out of the recesses 96, which may require one or both of the members 84, 86 to flex. In such examples, the thickness of each member 84, 86, their resistance to flexing, the size of the projections 94, friction between engaged surfaces of the members 84, 86, steepness of the overlapped/engaged surfaces (relative to the axis of rotation) of the projections 94 and recesses 96 and other factors may be controlled to provide a desired threshold force where the projections 94 are removed from the recesses 96 and relative rotation may occur between the first and second members 84, 86. After a certain amount of relative rotation between the first member 84 and the second member 86, each projection 94 will become aligned with and received within another recess 96. If the threshold differential force still exists across the second clutch 20, the projections 94 will be moved out of these recesses 96 and more relative rotation will be permitted.

Another factor in determining the threshold force at which relative rotation is permitted is the tightness at which the first member 84 and second member 86 are coupled together. In the example shown, the first member 84 and second member 86 are connected together near their centers (i.e. near the axis 58 of rotation) and the projections 94 and recess 96 are located radially outwardly from the point or area of connection. To facilitate relative sliding and rotary motion between the first and second members 84, 86, some axial play or clearance is provided between them. One way to accomplish this in a repeatable manner for mass production is by providing a connector having retaining surfaces that are axially offset by a distance greater than the combined thickness of the first member 84 and second member 86 in the region of the retaining surfaces.

Figures 8, 9, 10:
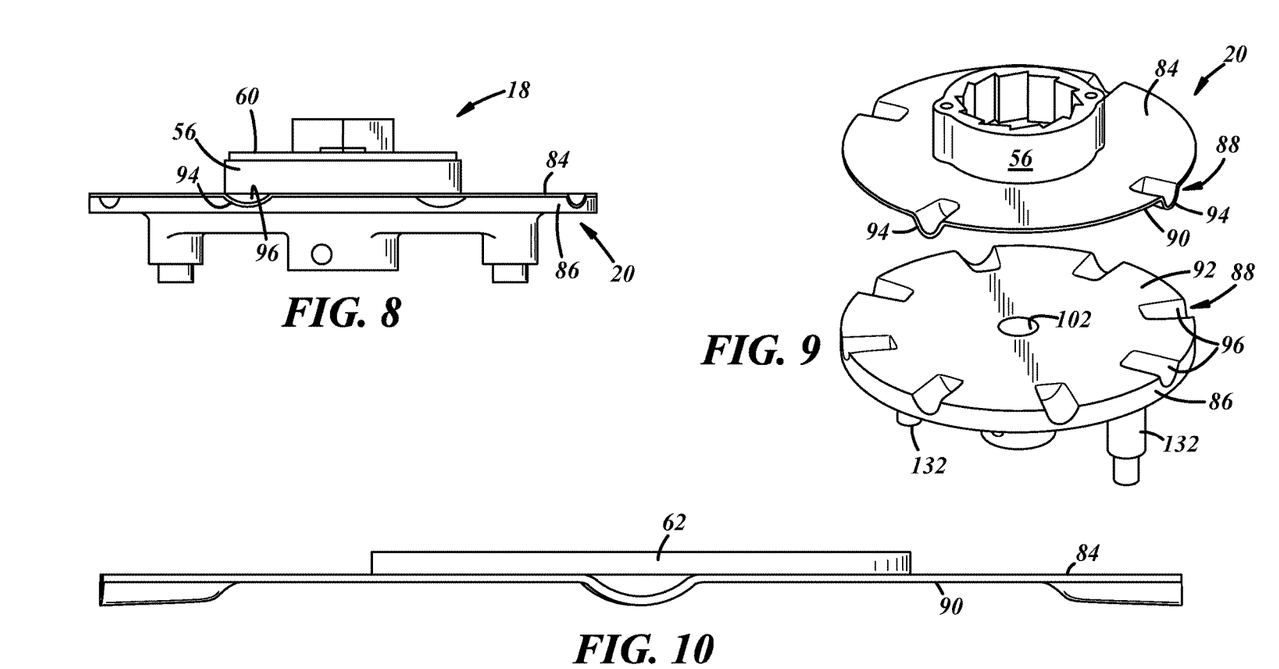
FIG. 8 is a side view of the first clutch and a second clutch of the cable control assembly.
FIG. 9 is an exploded view of the second clutch.
FIG. 10 is a side view of a first member of the second clutch in an unflexed state.
Figure 12:
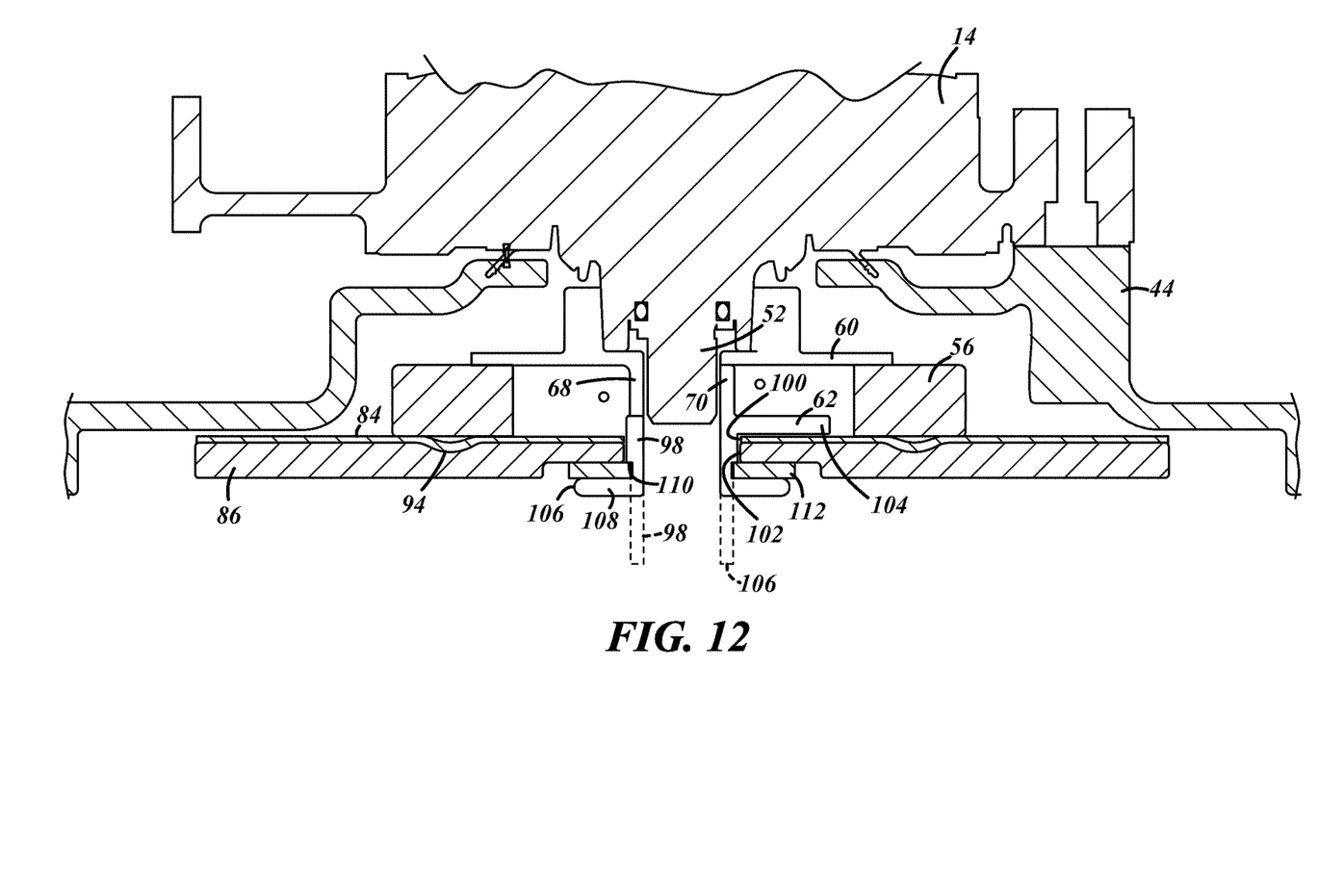
FIG. 12 is a partial sectional view of the cable control assembly.

In the implementation shown, the connector is integral with the lower plate 62 of the first member 54 of the first clutch 18 and includes a depending cylindrical projection or boss 98. In assembly, as shown in FIG. 12, the boss 98 is received through aligned openings 100, 102 in the first and second members 84, 86 of the second clutch 20 with at least a portion of the plate 62 radially overlapping part of the second clutch first member 84 and defining a first retaining surface 104. Then the free end 106 of the boss 98 is deformed outwardly to overlie a portion of the second member 86 and define a second retaining surface 108. The projection 98 before being deformed is shown in dashed lines and is shown in solid lines in its final state after being deformed. To control the axial distance between the retaining surfaces 104, 108, the boss 98 may include a shoulder 110 between the retaining surfaces against which a washer or spacer 112 is received. The spacer 112 is trapped between the second retaining surface 108 (when formed) and the shoulder 110, and the shoulder 110 is a predetermined axial distance from the first retaining surface 104. This provides a desired axial spacing between the first and second retaining surfaces 104, 108. Hence, in this example, all four members 54, 56, 84, 86 of the first and second clutches 18, 20 are coupled together and may be handled and assembled as a unit within the control system 10, as generally shown in FIG. 8.

Figure 11:
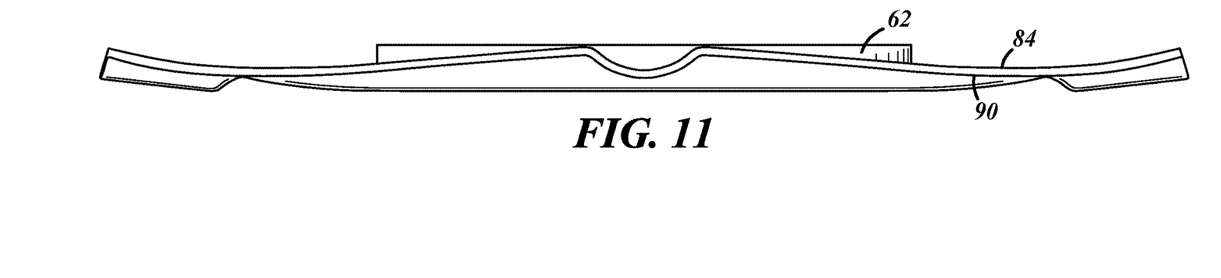
FIG. 11 is a side view of the first member of the second clutch in a flexed state.

In the example shown, the retention elements 88 include four evenly spaced projections 94 and eight evenly spaced recesses 96, so every forty-five degrees of relative rotation between the first and second members 84, 86 each projection 94 will be aligned with a respective one of recesses 96. Of course, this is just one example and any number of projections 94 and recesses 96 may be provided, as desired. The first and second members 84, 86 may be formed from metal, a polymer a composite or any combination of these, and may be formed in one piece or multiple pieces to provide the desired operational relationship. Also, as shown in FIGS. 8 and 9, one of the members may be constructed to flex while the other may be more rigid so that it flexes less or not at all. As shown, the second member 86 is thicker and more rigid than the first member 84 so that the first member 84 flexes to permit the relative rotation and the second member 86 does not flex to any significant degree. FIG. 10 shows the first member 84 in its unflexed state and FIG. 11 shows the first member 84 in its flexed state wherein the projections 94 may be removed from the recesses 96 to disengage the retention elements 88 of the first member 84 from the retention elements 88 of the second member 86. Further, while the first member 84 is shown as containing only projections 94 and the second member 86 is shown as including only recesses 96, each member may have both recess and projections, if desired. And while the projections 94 and recesses 96 are shown the same radial distance from the axis of rotation, they may be provided in radially offset sets, if desired.

Figures 13, 14, 15:
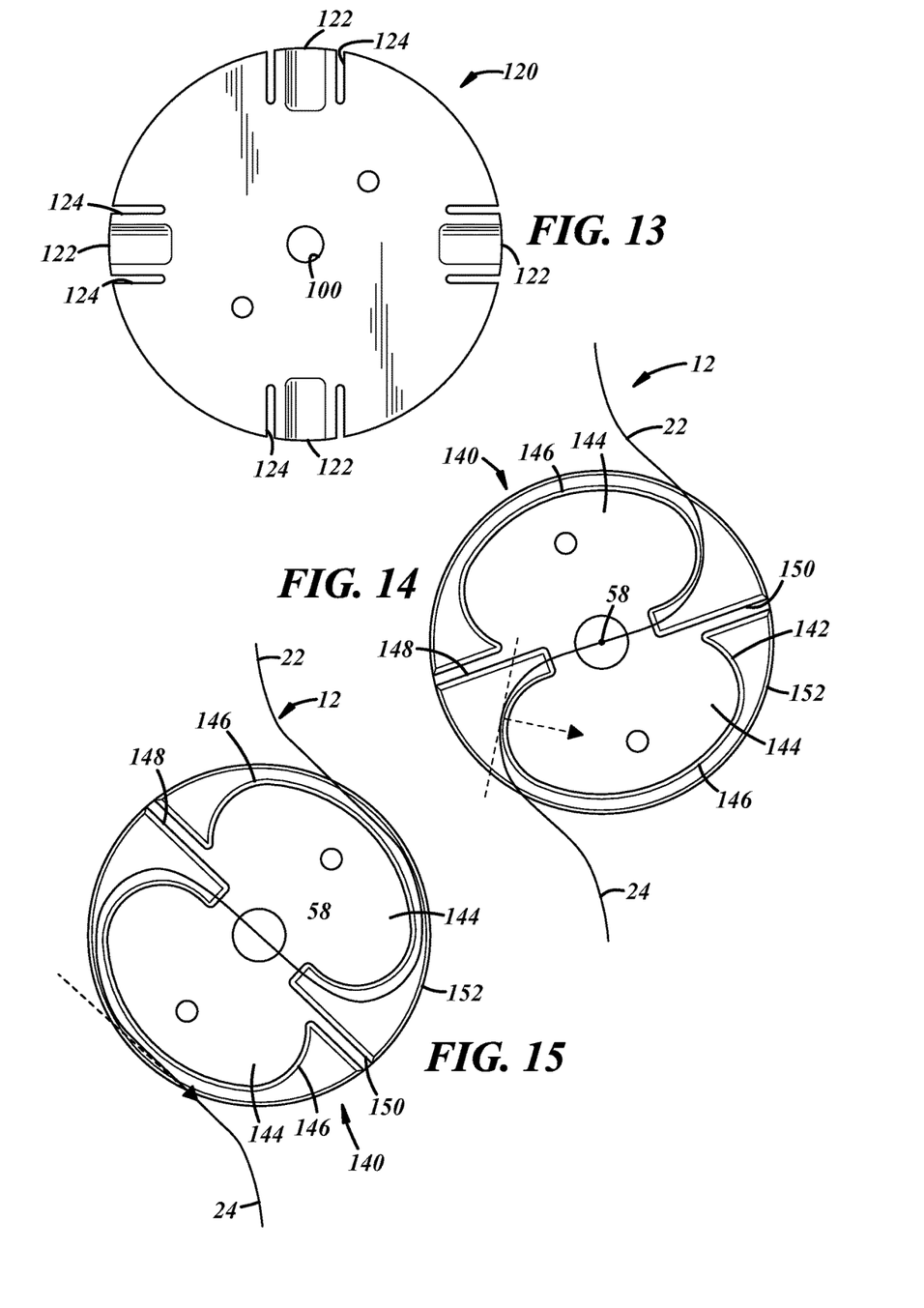
FIG. 13 is a plan view of one implementation of a first member of the second clutch.
FIGS. 14-16 illustrate a spool of the cable control assembly rotated in different positions and shown increasingly taking up cable.

FIG. 13 illustrates a modified first member 120 which may be substituted for the first member 84 of the second clutch 20. The first member 120 is shown with four projections 122 formed therein and slots 124 cut through the first member 120 on either side of each projection 122. The slots 124 weaken the first member 120 to increase the flexibility of the portions including the projections 122 and thereby reduce the threshold force required to permit relative rotation between the first and second members of the clutch. The length and number of slots 124 or other weakening features may be controlled to provide a desired threshold force in a second clutch including this first member 120. In this way, the first member may have the same basic construction and be modified for various applications by providing calibrated weakened areas or features to provide different threshold forces for clutches in various applications.

Figures 16, 17, 18:
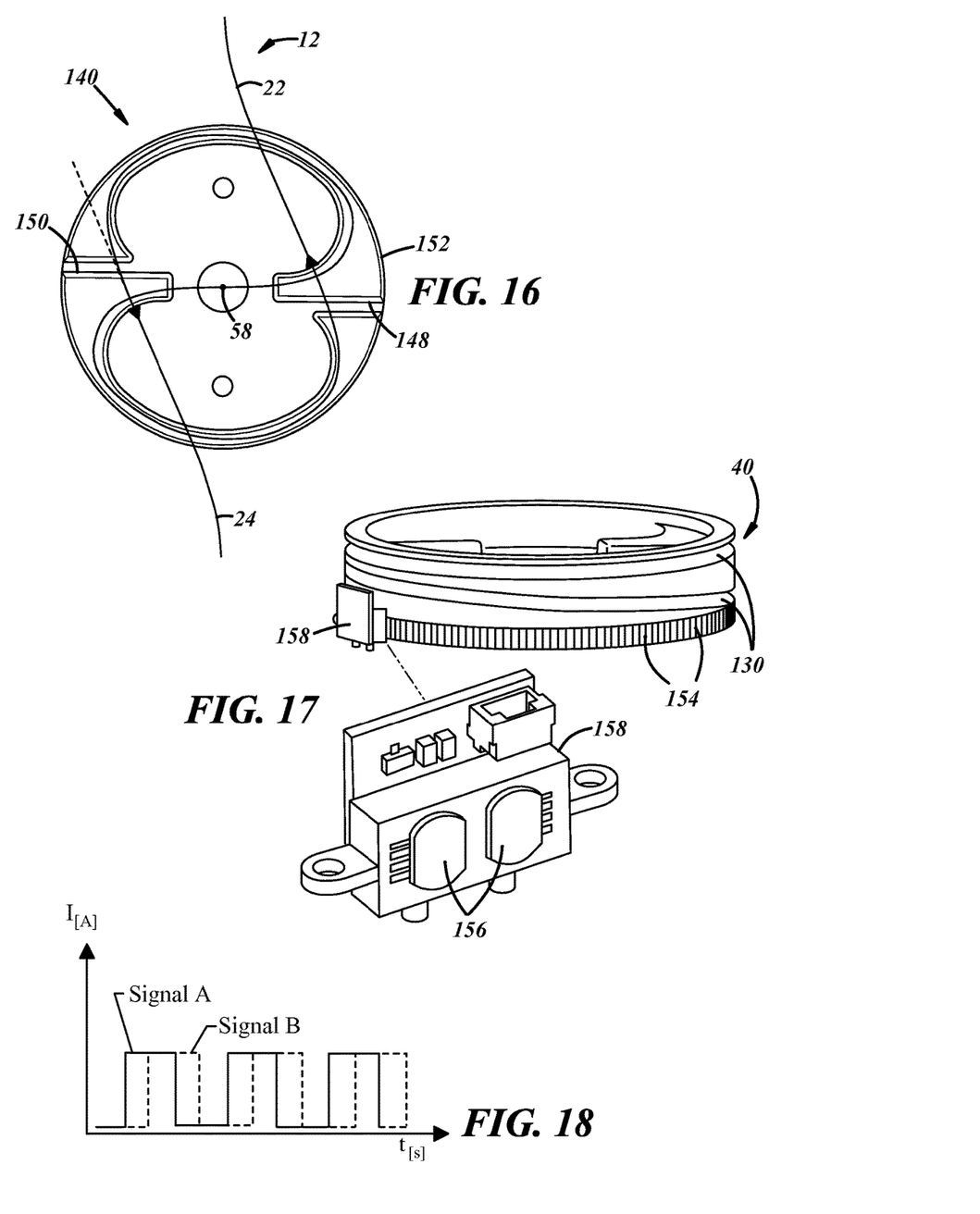
FIG. 17 is an exploded perspective view showing an enlarged sensor module used with the spool to provide feedback regarding the rotational position of the spool.
FIG. 18 is a graph of signals received from two sensors that may be included in the sensor module used with the spool.

The spool 40 shown in FIGS. 4, 5 and 17 is generally cylindrical and may have one or more tracks or grooves 130 about its periphery into which the cable 12 is wound as the tailgate 16 is moved to its closed position. The spool 40 may be coupled to the second clutch second member 86 so that these components rotate together. In the example shown, the second clutch second member 86 includes one or more posts 132 and the spool 40 includes openings 134 (e.g. a hole, slot or cavity) that receive the posts 132. The cylindrical spool 40 and generally circular tracks 130 provide an essentially constant moment arm on the cable 12 as the cable 12 is taken up on the spool 40 and requires a generally constant motor torque to wind the cable 12 onto the spool 40. To maintain tension on the cable 12, the spool 40 may be yieldably biased in the first direction by a take up actuator 136 (FIGS. 4 and 5). In the example shown, the take up actuator is a torsion spring 136 that has one end acting on the spool 40 and its other end coupled to the housing 34.

FIGS. 14-16 illustrate an alternate spool 140 and show various positions of the spool 140 as it progressively takes up cable 12 onto the spool from the position shown in FIG. 14, to the position shown in FIG. 15 and then the position shown in FIG. 16. As shown, the spool 140 includes a contoured track 142 in or about which the cable 12 is wound as the spool is rotated in a first direction (clockwise as viewed in FIGS. 14-16) and from which the cable 12 is paid out or unwound as the spool 140 is rotated in a second direction (counterclockwise as viewed in FIGS. 14-16). The track 142 may be defined in part by lobes 144 having an outer surface 146 on which the cable 12 is received and which is at a varying radial distance from the axis 58 of rotation. That is, the track 142 is not circular or a portion of a circle so that the spool 140 provides a variable moment arm acting on the cable 12 when taking up or paying out cable 12. The farther radially from the axis 58 of rotation that a point on the track is, the greater the moment arm provided by that portion of the spool 140 on the cable 12. Further, a greater track radius will take up more cable 12 for a given amount of rotation compared to a lesser track radius, so the rate at which the cable 12 is taken up or paid out can be varied. This may permit relatively fast movement of the tailgate 16 during a portion of its movement between open and closed positions and slower movement at another portion of the movement. For example, slower movement may be desired when the tailgate 16 is nearing its closed position and will be engaged with the vehicle body.

In a fully unwound position, where the pulley 140 would be rotated counterclockwise from the position shown in FIG. 14, the cable 12 may extend across the spool 140, generally across the axis 58 of rotation and the moment arm on the cable 12 may be essentially zero in that the spool 140 is not engaging or taking up the cable 12. During initial rotation of the spool 140, as shown in FIG. 14, each segment 22, 24 of the cable 12 engages and is taken up by a different one of the lobes 144 which may be symmetrical for uniform and synchronous engagement with the cable segments 22, 24. Initially, the track 142 of each lobe 144 is relatively close to the axis 58 and provides less of a moment arm on the cable 12. From this initial portion, the track 142 transitions to a larger radius portion about which the cable 12 is wound upon further rotation, as shown in FIG. 15. This larger radius portion of the track 142 provides a greater moment arm and also takes up cable 12 more quickly as the spool 140 is rotated. Further spool rotation, to the position shown in FIG. 16, decreases the moment arm by reducing the radial distance of the cable 12 from the axis 58 of rotation.

The position shown in FIG. 16, may represent the fully wound position of the spool 140, or the spool may be rotated further until cable segment 22 engages flat track portion or stop 148 and cable segment 24 engages flat track portion or stop 150. The stops 148, 150 may be oriented so that the cable 12 is at any desired distance from the axis 58 and are shown as being radially close to the axis 58 but extending to an outer periphery 152 of the spool 140. Rotation of the spool 140 beyond this point would provide a maximum moment on the cable 12 (periphery 152 represents the maximum radius) and require the highest torque to achieve. In the implementation shown, the cable 12 is not wound further and engagement of the cable 12 with the flat track portions 148, 150 is the fully wound position.

The variable moment arm provided by the spool 140 on the cable 12 can be beneficial in certain applications. For example, where the tailgate 16 must be pressed into seals to reach its fully closed position, the force needed to move the tailgate 16 to its fully closed position may be greater than for a comparable amount of movement elsewhere in the range of movement of the tailgate. A smaller moment arm on the cable 12 from the spool 140 when the tailgate 16 is nearly closed enables less motor torque to further wind the cable 12 and pull the tailgate 16 closed. Further, when the spool 140 is used with a clutch 20, such as described above, reducing the moment arm at certain locations in the movement of the tailgate 16, reduces the force that the clutch 20 needs to hold and the torque needed to override or slip the clutch 20 is reduced. Also, at the end of the cable unwinding, when the tailgate 16 is fully opened, the force on the cable 12 due to gravity may be greatest and providing a smaller moment arm on the cable 12 from the spool 140 enables less motor torque to begin movement of the tailgate 16.

As noted above, the tailgate 16 may be opened and closed by the motor 14. When the tailgate 16 is open, the cable segments 22, 24 are unwound from the spool 40, 140 and the length of the cable 12 outside of the housing 34 is the maximum. To close the tailgate 16, the motor 14 is actuated to rotate the input shaft 52 in a first direction (clockwise as shown in the drawings). The input shaft 52 rotation causes rotation of the first member 54 of the first clutch 18 which is coupled to the input shaft 52. Clockwise rotation of the first member 54 of the first clutch 18 causes clockwise rotation of the second member 56 of the first clutch 18 via engagement of the pawl stop surfaces 74 with the second member stop surfaces 80 (FIG. 7). Rotation of the second member 56 of the first clutch 18 causes rotation of the first member 84 of the second clutch 20 because these components are connected together. In normal use, the torque provided by the motor 14 to cause the noted components to rotate does not cause a differential force across the second clutch 20 that is greater than the threshold force needed to override or slip the second clutch 20. Accordingly, the rotation of the second clutch first member 84 causes rotation of the second clutch second member 86 which is coupled to the spool 40, 140 and thus causes rotation of the spool which takes up or winds the cable 12 onto the spool. In this way, relative rotation does not occur between the members 54, 56 or 84, 86 in either clutch 18, 20, the motor torque and rotation are transferred to the spool 40, 140 which takes up the cable 12 until the cable is fully wound onto the spool and the tailgate 16 is closed. In this position, the length of the cable 12 outside of the housing 34 is the minimum.

When opening the tailgate 16, gravity acting on the tailgate tends to rotate the spool 40, 140, second clutch 20 and the second member 56 of the first clutch 18 counterclockwise. This rotation is prevented by engagement of the pawls 64 with the first clutch second member 56 and is only permitted when the motor 14 is rotated in a second direction (opposite the first direction) which causes a corresponding rotation of the first clutch first member 54 and the pawls 64. Hence, the motor 14 controls unwinding of the cable 12 from the spool 40, 140 and opening of the tailgate 16.

The tailgate 16 may also be manually moved between its open and closed positions, and the clutches 18, 20 enable movement of the tailgate 16 without a corresponding rotation of the motor 14. This may be desirable for user convenience, and to permit the tailgate 16 to be opened and closed if the motor 14 is not working or electric power in the vehicle is lost. This may also permit the tailgate 16 to be opened or closed more quickly than is done by the motor 14. That is, the tailgate 16 could be moved even if the motor 14 is working. In this situation, the tailgate movement would not directly correspond to the motor movement, although there would be some motor movement. Further, in this way the motor 14 may be protected from an overload situation. For example, if a relatively large force acts on the tailgate 16 tending to move the tailgate 16 in the opposite direction that the motor 14 is trying to move the tailgate, one or both clutches 18, 20 may decouple the tailgate 16 from the motor 14 and permit movement of the tailgate without subjecting the motor to the relatively large counterforce. The operation of the control system 10 during manual opening and closing of the tailgate 16, without a corresponding rotation of the motor 14 (e.g. when the tailgate moves more than the motor causes) will be described next.

When a force is applied to the tailgate 16 to manually close the tailgate, the force on the spool 40, 140 is reduced or relieved to a point where the take up spring 136 causes rotation of the spool in the first direction (clockwise as viewed in the drawings) to wind cable onto the spool 40, 140. Rotation of the spool 40, 140 in the first direction causes a corresponding rotation of the second clutch 20 as well as the second member 56 of the first clutch 18. The second member 56 of the first clutch 18 can rotate clockwise relative to the first member 54 of the first clutch 18 because in that direction of rotation the transition surfaces 82 move the pawls 64 out of the way (i.e. pivots them radially inwardly) and the stop surfaces 74, 80 do not engage. Hence, as the tailgate 16 is manually closed, the spring 136 winds the spool 40, 140 and takes up the cable 12 to avoid slack in the cable 12 and ready the cable for a subsequent unwinding event when the tailgate 16 is next opened.

Conversely, to manually open the tailgate 16, the spool 40, 140 needs to be rotated in the second direction (counterclockwise as viewed in the drawings). The force tending to rotate the spool 40, 140 in the second direction is transferred to the second clutch 20 and the second member 56 of the first clutch 18. However, the pawls 64 prevent rotation of the second member 56 of the first clutch 18 counterclockwise relative to the first member 54 of the first clutch 18, and the first member 54 of the first clutch 18 is held against rotation by the motor 14. Therefore, movement of the tailgate 16 toward the open position is prevented until the force tending to open the tailgate 16 causes a differential force across the second clutch 20 that is sufficient to cause the second clutch second member 86 to rotate relative to the second clutch first member 84. Then, for so long as the force at the second clutch 20 is greater than the threshold force, relative rotation occurs at the second clutch 20 and the spool 40, 140 may unwind the cable 12 to allow the tailgate 16 to open.

In this way, the control system 10 permits powered opening and closing of the tailgate 16 while also permitting manual opening and closing of the tailgate. Because the manual tailgate movements are accomplished without a corresponding amount of motor rotation, it may be desirable to sense or monitor the position of the tailgate 16 so that the motor 14 may be intelligently commanded to rotate in a direction corresponding to a desired tailgate movement. As shown in FIGS. 4, 12 and 17, the spool 40 may include indicia or teeth 154 about its perimeter at a desired spacing to provide a desired resolution for sensors 156 that can sense movement of the teeth. The rotation of the indicia or teeth 154 past a sensor 156 may be recorded or interpreted so that a controller 158 associated with the control system 10 (the controller may be part of a vehicle control system or module, and/or may be part of the sensor arrangement as shown) can determine the instantaneous position of the tailgate 16. The sensors 156 may be optical, hall effect or any other type of sensor capable of detecting movement of the spool 40, 140 (or a component coupled to the spool). FIG. 18 shows a representative graph of the output signals from two spaced apart sensors 156 (where the signal A from one sensor is shown as a solid line and the signal B from the other sensor is shown as a dashed line) which may be used to provide redundant position sensing and/or to provide increased resolution of the sensed position, and/or to permit the direction of rotation of the spool to be determined.

With the sensors 156 and controller 158 being responsive to the tailgate position even when the tailgate 16 has been moved at least partially without corresponding motor rotation, improved control of the powered movement of the tailgate 16 can be achieved. For example, even if the motor 14 did not cause the tailgate 16 to close, the controller 158 determines that the tailgate 16 is closed and thereafter does not attempt to rotate the motor 14 in a direction that would close the tailgate 16. Instead, the controller 158 would know that the motor 14 should only be rotated in the direction tending to open the tailgate 16. Further, knowing the position of the tailgate 16 may permit the tailgate 16 to be closed in a desired manner or sequence relative to a window or adjacent component (e.g. in a split liftgate where an upper window may be opened and closed independently of a lower tailgate portion).

It should be understood that all references to direction and position, unless otherwise indicated, refer to the orientation of the components illustrated in the drawings. In general, up or upward generally refers to an upward direction within the plane of the paper and down or downward generally refers to a downward direction within the plane of the paper, and again refers to the orientation of the components shown in the drawings without intent to limit the components to only that orientation.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A cable control system, comprising:
   a spool on which a portion of a cable may be taken up and released;
   an input shaft coupled to the spool;
   a motor coupled to the input shaft to drive the input shaft and spool in a first direction to take up cable on the spool and in a second direction to release cable from the spool;
   a first clutch having a first member coupled to the input shaft and a second member coupled to the spool, wherein the first clutch selectively permits rotation of the second member relative to the first member to allow rotation of the spool in the first direction without corresponding rotation of the motor; and
   a second clutch having a first member coupled to the input shaft and a second member coupled to the spool, wherein the second clutch selectively permits rotation of the second clutch second member relative to the second clutch first member to allow rotation of the spool in the second direction without corresponding rotation of the motor.

2. The system of claim 1 wherein the first clutch prevents rotation in the first direction of the first clutch second member relative to the first clutch first member and permits rotation in the second direction of the first clutch second member relative to the first clutch first member.

3. The system of claim 2 wherein the second clutch prevents relative rotation between the second clutch first member and the second clutch second member until a threshold force differential is applied across the second clutch.

4. The system of claim 1 which also comprises a take up actuator coupled to the spool to rotate the spool relative to the input shaft in the first direction when the spool rotates relative to the input shaft.

5. The system of claim 4 wherein the take up actuator includes a spring that yieldably biases the spool for rotation in the first direction.

6. The system of claim 1 wherein the first clutch first member includes one or more pawls and the first clutch second member includes one or more teeth selectively engageable with a pawl, wherein the teeth and pawl have stop surfaces that engage each other during rotation in the first direction.

7. The system of claim 6 wherein at least one of the pawls or the teeth are movable to permit relative rotation between the first clutch first member and the first clutch second member in the second direction.

8. The system of claim 7 wherein the pawls are pivoted on the first clutch first member and the pawls are yieldably biased into an engagement orientation wherein the pawl stop surfaces are oriented to engage corresponding teeth stop surfaces upon rotation in the first direction.

9. The system of claim 1 wherein the first clutch second member is coupled to the spool by the second clutch.

10. The system of claim 9 wherein the first clutch second member is coupled to and rotates with the second clutch first member.

11. The system of claim 10 wherein the second clutch second member is coupled to and rotates with the spool.

12. The system of claim 1 wherein the second clutch first member and the second clutch second member include retention elements that are engaged until a threshold differential force is applied to one of the second clutch first member and the second clutch second member whereupon the retention elements disengage and permit relative rotation between the second clutch first member and the second clutch second member.

13. The system of claim 12 wherein at least one of: a) the second clutch first member, b) the second clutch second member or c) the retention elements of at least one of the second clutch first member and the second clutch second member are movable or flexible under the threshold differential force.

14. The system of claim 12 wherein the second clutch first member and second clutch second member include generally flat surfaces and the retention members include nonplanar portions of the generally flat surfaces.

15. The system of claim 13 wherein at least one of the second clutch first member and the second clutch second member includes weakened portions to decrease the threshold differential force required to disengage the retention elements.

16. The system of claim 14 wherein the second clutch first member is more flexible than the second clutch second member so that the first member flexes when the threshold differential force is exceeded.

17. The system of claim 1 which also includes at least one sensor and a controller communicated with the sensor, the sensor providing to the controller a signal indicative of the rotary position of the spool, and the controller being communicated with the motor and operable to enable control of the motor as a function of the sensor signal.

18. A powered tailgate assembly, comprising:
    at least one cable adapted to be coupled between a vehicle body and a vehicle tailgate;
    a spool operably associated with the cable to take up cable as the tailgate is retracted and to release cable when the tailgate is lowered;
    a electrically powered drive releasably coupled to the spool to rotate the spool in a first direction to cause the tailgate to move toward a closed position and a second direction to cause the tailgate to move toward an open position;
    a first clutch coupled between the drive and the spool to permit rotation of the spool relative to drive when the tailgate is moved toward the closed position by something other than the drive; and
    a second clutch coupled between the drive and the spool to permit rotation of the spool relative to the drive when a threshold force is applied to the tailgate, by something other than the drive, to move the tailgate toward the open position.

19. The assembly of claim 18 wherein the first clutch is coupled to the drive and to the second clutch, and the second clutch is connected to the first clutch and to the spool.

20. The assembly of claim 18 wherein the second clutch includes a second clutch first member and a second clutch second member releasably coupled to the second clutch second member and to the spool, and the first clutch includes a first clutch first member coupled to the drive for rotation with the drive and a first clutch second member coupled to second clutch first member for rotation with the second clutch first member.

21. The assembly of claim 18 which also includes a take up actuator coupled to the spool to rotate the spool relative to the drive in the first direction when the tailgate is moved toward the closed position without corresponding movement of the drive.

22. The assembly of claim 18 which also includes at least one sensor and a controller communicated with the sensor, the sensor providing to the controller a signal indicative of the rotary position of the spool, and the controller being communicated with the drive and operable to enable control of the drive as a function of the sensor signal.

* * * * *